United States Patent [19]

Philpot

[11] Patent Number: 5,407,120
[45] Date of Patent: Apr. 18, 1995

[54] ROTARY SWAGING OF GAS GENERATOR FILTERS

[75] Inventor: Paul T. Philpot, Layton, Utah

[73] Assignee: Morton International, Inc., Chicago, Ill.

[21] Appl. No.: 248,933

[22] Filed: May 25, 1994

[51] Int. Cl.⁶ .............................................. B23K 31/00
[52] U.S. Cl. ................... 228/155; 29/163.8; 29/419.1; 72/356; 72/367
[58] Field of Search ............... 228/155, 182; 29/163.3, 29/163.6, 163.8, 890.08, 890.053, 419.1; 72/76, 356, 367

[56] References Cited

U.S. PATENT DOCUMENTS

| | | | |
|---|---|---|---|
| 3,779,221 | 12/1973 | Gartner | 123/573 |
| 4,296,084 | 10/1981 | Adams et al. | 423/351 |
| 4,878,690 | 11/1989 | Cunningham | 280/741 |
| 4,998,751 | 3/1991 | Paxton et al. | 280/741 |

*Primary Examiner*—Samuel M. Heinrich
*Attorney, Agent, or Firm*—Charles N. Lovell; Gerald K. White

[57] ABSTRACT

A method for re-sizing and re-shaping wrapped multiple layered or stack-up cylindrical air bag inflator filter assemblies. This invention is specifically directed to manufacturing cylindrical air bag filter assemblies exhibiting superior dimensioned characteristics such as diameter, wall thickness, roundness, straightness, cylindricity by subjecting the as-wrapped filter assemblies to a rotary swaging operation.

8 Claims, 2 Drawing Sheets

ROTARY SWAGING OF GAS GENERATOR FILTERS

BACKGROUND OF THE INVENTION

1. Field of the Invention

This invention relates generally to manufacturing filters for inflatable type modular occupant restraint systems for passenger vehicles or, as they are commonly known, air bag restraint systems. The filter in such systems functions to cool hot gases before they reach the air bag and serves to trap particulates and residues generated during ignition so that they do not enter the air bag and escape into the vehicle. More particularly, this invention relates to an improved method for manufacturing inflator filters which includes re-sizing and re-shaping said filters by subjecting the filters to a rotary swaging operation.

2. Description of The Related Art

Filter assemblies generally available in the art include alternating layers of screen and ceramic paper. Paxton et al, U.S. Pat. No. 4,998,751, which is assigned to the assignee of the present invention, disclose a filter assembly which comprises two wraps of nickel coated carbon or stainless steel 30-mesh screen, metal filters such as 80×700 or 50×250-mesh stainless steel or 40×180-mesh nickel coated carbon steel, a single wrap of ceramic filter paper 0.080 inches thick followed by two wraps of 30-mesh stainless steel or nickel coated carbon steel.

The filter assemblies are, typically, manufactured by wrapping the different filter materials circumferentially around a mandrel. Cunningham, U.S. Pat. No. 4,878,690, which patent is assigned to the assignee of the present invention, discloses a cylindrical filter assembly manufactured accordingly. The filter assemblies are manufactured as single units by hand and/or machine. The particular geometry of the filter assemblies and the number of wraps of filter materials are determined by the designed end use of the assemblies.

There is a roundness problem associated with making cylindrical filter assemblies for air bag inflators, which have wrapped multiple layered or stack-up structural configurations. The use of such wrapped multiple layers or stack-ups inherently results in a screen pack assembly exhibiting an out-of-round, i.e., ellipsoidal, cross-section. This inherent lack of roundness is exacerbated as the number of layers of filter materials increase and is particularly acute at the overlap outside diameter (O.D.).

Re-sizing cylindrical filters for use in air bag inflator systems has been a topic of concern in the art dating back to early driver side air bag applications. However, on passenger side air bag programs resizing of oversize filters was a dead issue from the beginning since the diameter requirement was only a maximum. More recently, the implementation of a minimum diameter requirement coupled with existing maximum requirements has revived interest in re-sizing. One re-sizing method comprises reworking oversize passenger screens by sizing them down to size through the use of a split tubular (clam shell) stationary die mounted to a press. Use of the clam shell method for re-sizing has not proved satisfactory because it requires operating with a minimal oversize tolerance in order to prevent screen damage. With a clam shell die the majority of the working occurs at the die separation region and this results in localized working. There is also a finning or winging problem associated with the use of a clam shell die when large diameter as-wrapped screen packs are worked. Thus, the use of a clam shell die places restrictions on the as-wrapped O.D.s of the screen pack that can be successfully re-sized. Further, the inherent ellipsoidal shape of the as-wrapped filter screen packs requires special placement of the screen pack into the clam shell die. The maximum diameter of the ellipsoidal shaped screen must be aligned with the vertical axis of the die member to effect re-sizing and re-shaping of the as-wrapped screen pack.

The consistent and economical manufacture of filter assemblies for air bag inflator systems, which efficiently cool and clean gas from the gas generant, is of prime concern. The implementation of a resizing process for producing cylindrical filter assemblies exhibiting superior dimensional characteristics such as diameter, wall thickness, roundness, straightness, cylindricity, etc. and which exhibit lower residue levels has obvious advantages and benefits.

SUMMARY OF THE INVENTION

An object of this invention is to provide an improved method for re-sizing and re-shaping wrapped multiple layered or stack-up cylindrical air bag inflator filters having at least one open end and internal and external surfaces to the required size and shape, which filters are designed for use in gas generators for passenger side, driver side, side impact and rear seat inflatable air bag occupant restraint systems. Further, an object of this invention is to enhance the performance of the manufacturing process for making air bag filters by producing filters exhibiting superior dimensional characteristics such as diameter wall thickness, roundness, straightness, cylindricality, etc. Another object of this invention is to provide a method of manufacturing an air bag inflator filter having superior characteristics which enhances its performance when employed in an air bag gas generator by providing lower particulate levels with less variation upon firing of the inflator.

These objects have been achieved by a novel process for resizing and re-shaping wrapped multiple layered or stack-up cylindrical filter assemblies to the required size and cylindricity, which comprises subjecting the as-wrapped filter assemblies to a rotary swaging operation. The rotary swaging process of this invention can be used for re-shaping discrete filters or continuous filter lengths.

While rotary swaging has been available to industry since the early 1900's it has generally been applied to making cylindrical parts from rods, tubes and wire. Rotary swaging alters the diameters or shape of such components by means of a large number of controlled-impact blows applied radially by one or more pairs of opposed dies. The dies are appropriately shaped to give the part the required form. Metals that are suitable for metal forming processes in general are also the most readily swageable. Best results are generally obtained with low-carbon steels and ductile nonferrous metals. The use of swaging to re-size and/or re-shape filtering systems for air bag inflators in accordance with this invention is novel and results in lower particulate levels when compared with filters which were not re-sized and/or re-shaped. High residue weights in air bag inflators have been attributed to an inherent lack of roundness of cylindrical filter units. Swaging has been discovered to improve filter roundness. Swaging has also been found to provide reduced residue weight readings compared to unswaged filter screen packs.

Reworking of oversize filters assemblies by sizing them down to size through the use of a split tubular (clam shell) die mounted to a press has limited utility and cannot be appropriately used for re-sizing larger diameter filters. The clam shell die produces excess finning and accordingly is limited to re-sizing cylindrical filters having O.D.s about 0.025 in. above maximum. It has been discovered that this finning problem is overcome through the use of rotary swaging. Further, it was discovered that post-swage O.D. can be maintained consistently if the initial filter O.D. is at least 0.035 in larger than the inside diameter (I.D.) of the swaging die. This permits a larger tolerance, ie O.D. range from the winding machine.

BRIEF DESCRIPTION OF THE DRAWINGS

With this description of the invention, a detailed description follows with reference to the accompanying figures of drawings which form part of the specification, and of which.

DESCRIPTION

The method of re-sizing and re-shaping inflator filter assemblies according to this invention by employing a rotary swaging operation will now be described with reference to specific embodiments thereof.

Figure 1:
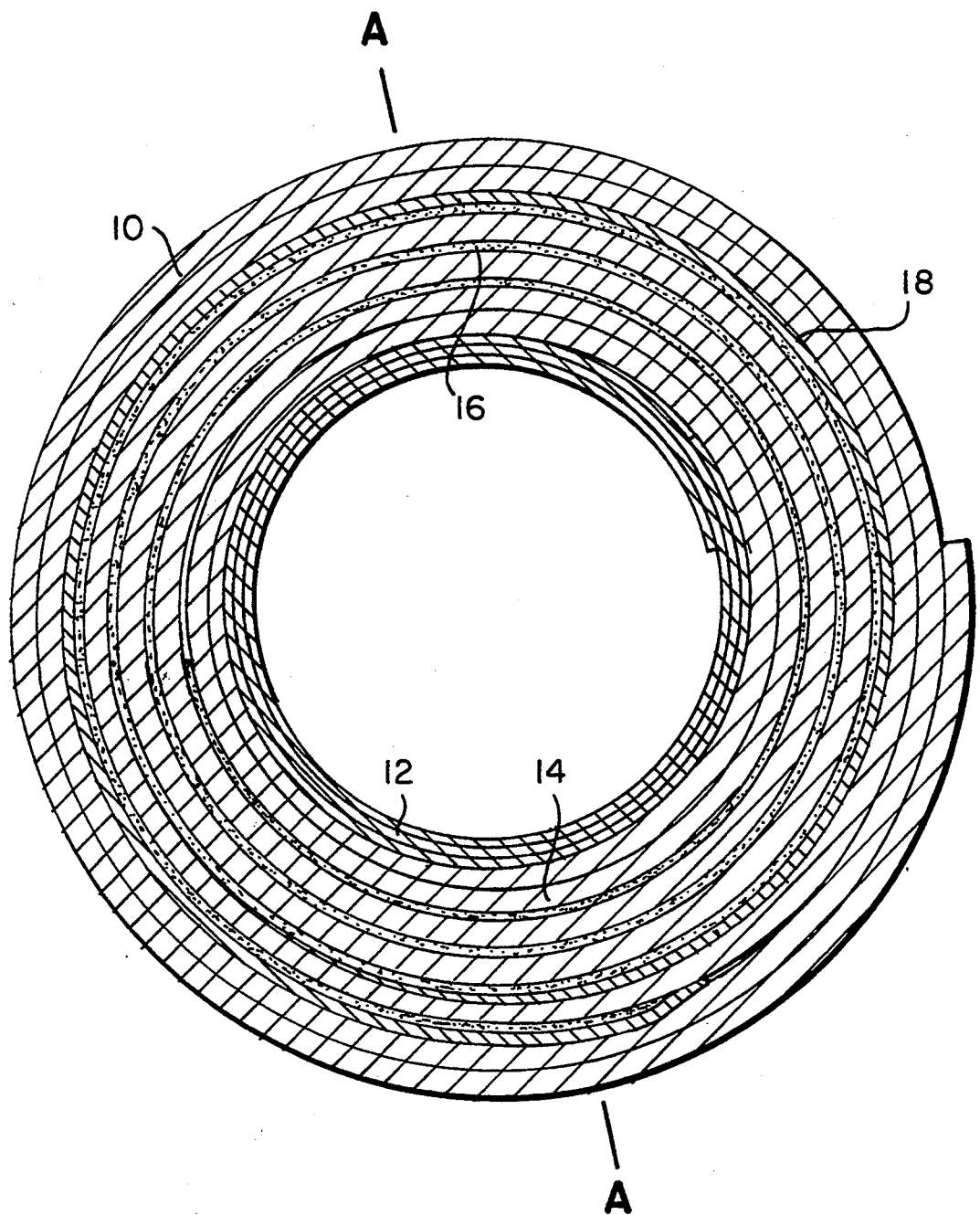
FIG. 1 is a cross-sectional view of a cylindrical passenger side as-wrapped filter assembly which is re-sized and re-shaped by swaging according to the process of this invention.

An as-wrapped cylindrical passenger side filter assembly which is subject to re-sizing and re-shaping by the swaging process of this invention is shown in FIG. 1. Filter assemblies of the type shown in FIG. 1 are described in co-pending application—Morton case number 2494-21-00 filed on even date herewith. The filter unit 10 comprises an inner 30×30-mesh tube 12 and additional wraps of 18×18-mesh metal woven cloth 14, paper filter 16 and 45×170-mesh metal woven cloth be wound thereabout. Filter unit 10 is manufactured by cutting 18×18-mesh metal woven cloth and 45×170-mesh metal woven cloth to length, positioning them together on a lay-up table and welding to form a wire cloth laminate. Paper filter 16 such a Lydall 924 filter paper, is then cut to length and positioned to the wire cloth laminate. The leading edge of the wire cloth/paper filter subassembly is welded to the exterior surface of the inner 30×30 tube 12 and the wire cloth laminate and paper filter are wound outward around said tube 12 in an outer wrap machine. The trailing edge of the radially most outward portion of said laminate is welded to the thus formed cylindrical filter body so that the wire cloth laminate and filter paper are maintained in cylindrical relation about said core. As shown in FIG. 1, the maximum O.D. of the as-wrapped screen pack occurs in the vicinity of line AA with the minimum O.D. displaced approximately 90° therefrom.

The 30×30-mesh wire cloth is cut to length and curled using a conventional two roll former (0.75 in. diameter steel knurled roller and a 2 in. diameter urethane roller, 50 durometer) into cylindrical form to provide tube 12. The two roll former rolls the wire cloth into a capture tube while the cylindrical form is being produced. Two finish roll belts assist the wire cloth all the way into the capture tube. Once the wire cloth is completely in the capture tube it is stripped into a sizing tube. The wire cloth is sized to the same diameter as the sizing tube and then welded together by resistance welding to form self supporting tube 12.

The as-wrapped cylindrical filter assembly is then re-sized and re-shaped by subjecting said assembly to the rotary swaging operation of this invention. A Fenn F-4 swaging machine, manufactured by Fenn Manufacturing, Newington, Conn. was utilized to carry out the swaging operation. The swage tooling consisted of two semi-circular, cross-section dies backed by hammer blocks. The die sections each had a 4° relief taper. As the die assembly rotates, the hammer blocks strike a series of 12 rollers that cause the dies to be driven together. The filter assembly is formed to the desired size/shape by repeatedly compressing the part between the die halves. A spindle speed of 200 rpm was typically employed to swage the filter assembly. Zero clearance dies were preferred. Accordingly, shims were inserted as needed between the die halves and the hammer blocks to assure that the dies closed completely. Further, it was found that use of an internal mandrel during swaging improved part roundness significantly and is preferably used to maintain the internal diameter integrity. A feed rate of up to 3 inches or more per second was the typical work employed. The degree of resizing was found to be dependent upon the initial size of the filter. Maximum filter O.D. as-wrapped for the filters comprising a perforated support tube is targeted in the 2.145 in.–2.18 in. range. The target O.D. for the post swaged filters is about 2.113 in.

By way of illustration and not limitation it is noted that for the passenger side filter shown in FIG. 1, the materials of which the filter components are made and the dimensions thereof where relevant are as indicated below:

| Components | Functions | Materials | Dimensions |
| --- | --- | --- | --- |
| filter cloth-12 | Combustion screen holds large particles and slag and provides some initial cooling | carbon steel | 30 × 30 mesh .011" wire diameter |
| coarse screen filter cloth-14 | Support ceramic paper. Aids in wrapping filter, provides cooling and supports fine screen. | carbon steel | 18 × 18-mesh .017" wire diameter |
| filter paper Lydall 924-16 | Filters particulates. Cools gas flow. | ceramic, mfd. by Lydall, Inc. New Hampshire | |
| fine screen filter-18 | Filters and cools the gases | stainless steel | 45 × 170-mesh |

While FIG. 1 shows a filter construction comprising three wraps of the 30×30-mesh screen, six wraps of the 18×18-mesh screen, three wraps of the paper filter and one wrap of the 45×170-mesh fine screen, it is to be understood that the swaging process of this invention is useful for re-sizing and re-shaping wrapped multiple layered or stack-up cylindrical filter constructions comprising different mesh screens, number of individual filter elements, number of wraps and/or additional or alternative materials in structuring the filter unit.

While the preceding embodiment is directed to manufacturing filter units which do not include a perforated support tube, the swaging process of this invention also finds application in re-sizing and re-shaping filters of the type which include a perforated support tube. In this embodiment the leading edge of the aforesaid wire cloth/paper filter subassembly is welded to the exterior surface of a perforated support tube and then wound outward around said support tube in an outerwrap machine. The trailing edge of the radially most outward position of said laminate is welded to the thus formed cylindrical filter body so that the wire cloth laminate and paper filter are maintained in cylindrical relation about said perforated support tube. Unlike the previously described embodiment, the 30×30 mesh wire cloth 12 is stripped from the capture tube into the perforated support tube. The wire cloth 12 is then sized to the same diameter as the perforated support tube and is then welded to the perforated support tube which has been wrapped with the 18×18 mesh wire cloth, the Lydall 924 filter paper and the 45×170 mesh wire cloth.

The maximum filter O.D. as swaged for filters that do not employ a perforated support tube is targeted in the 2.100 in.–2.107 in. range. It was observed that post swage O.D. can be maintained consistently if the initial filter O.D. is at least 0.035 in. larger than the die I.D. This will target maximum filter O.D.s as wrapped in the 2.12 in.–2.18 in. range, which is a significant tolerance increase over filters including the perforated support tube.

Tests of filters, which do not have a perforated support tube, swaged in a 2.097 die (0→diameter) and checked for roundness using filter gauge 0245-12 showed that the average roundness was improved from 0.0144 in to 0.0056 with a significant improvement at the trailing end of the 18×18-mesh screen. The term roundness is defined in this invention as:

$$\frac{\text{max. O.D.} - \text{min. O.D.}}{2}$$

Firing tests conducted under substantially the same conditions showed that swaged tubeless filter screen packs provided lower residue levels compared with unswaged tubeless filter packs. The results of such tests are shown in Tables 3 and 4.

TABLE 3

| Sample | P Max[1] | Unsized P40[2] | Delay[3] | Pcomb[4] | Residue[5] |
|---|---|---|---|---|---|
| 1 | 96.2 | 90.5 | 4.5 | 2675 | 7.7 |
| 2 | 81.1 | 79.3 | 4.3 | 2623 | 6.25 |
| 3 | 70.5 | 69.6 | 4.5 | 2525 | 2.56 |
| 4 | 77.2 | 74.9 | 4.3 | 2831 | 6.04 |
| 5 | 109.1 | 105.8 | 4.2 | 2760 | 15.74 |
| 6 | 97.7 | 65.2 | 4.4 | 2446 | 9.8 |
| 7 | 74.5 | 72.8 | 4.1 | 2454 | 6.22 |
| 8 | 73.5 | 71.9 | 4.4 | 2633 | 4.06 |
| 9 | 70.7 | 69.5 | 4.1 | 2826 | 2.63 |
| 10 | 72.5 | 71 | 4.3 | 2777 | 3.86 |
| 11 | 71.1 | 69.9 | 4.1 | 2819 | 3.91 |

TABLE 4

| Sample | P Max[1] | Swaged P40[2] | Delay[3] | Pcomb[4] | Residuehu 5 |
|---|---|---|---|---|---|
| 12 | 66.9 | 65.8 | 4.1 | 2149 | 0.92 |
| 13 | 67.2 | 65.9 | 4.4 | 2014 | 0.94 |
| 14 | 66.2 | 64.9 | 4.5 | 2140 | 1.13 |
| 15 | 66.8 | 65.8 | 6.1 | 2178 | 0.79 |
| 16 | 65.6 | 64 | 4.6 | 2077 | 0.93 |
| 17 | 65.7 | 64.2 | 6 | 2007 | 0.78 |
| 18 | 69 | 67.71 | 4.4 | 2322 | 1.34 |
| 19 | 65.8 | 64.7 | 4.1 | 2159 | 0.96 |
| 20 | 64.6 | 63.8 | 3.8 | 2191 | 0.92 |
| 21 | 67.2 | 66 | 4 | 2291 | 1.09 |

[1] ksi
[2] P at 40 msec. (psi)
[3] msec.
[4] P/combustion chamber (psi)
[5] grams As shown in Tables 3 and 4, the swaged screen packs had an average residue content of 0.980 grams whereas the unswaged screen packs had an average residue content of 6.2518 grams. This represents approximately an 84% reduction in residue content as a result of the swaging.

Figure 2:
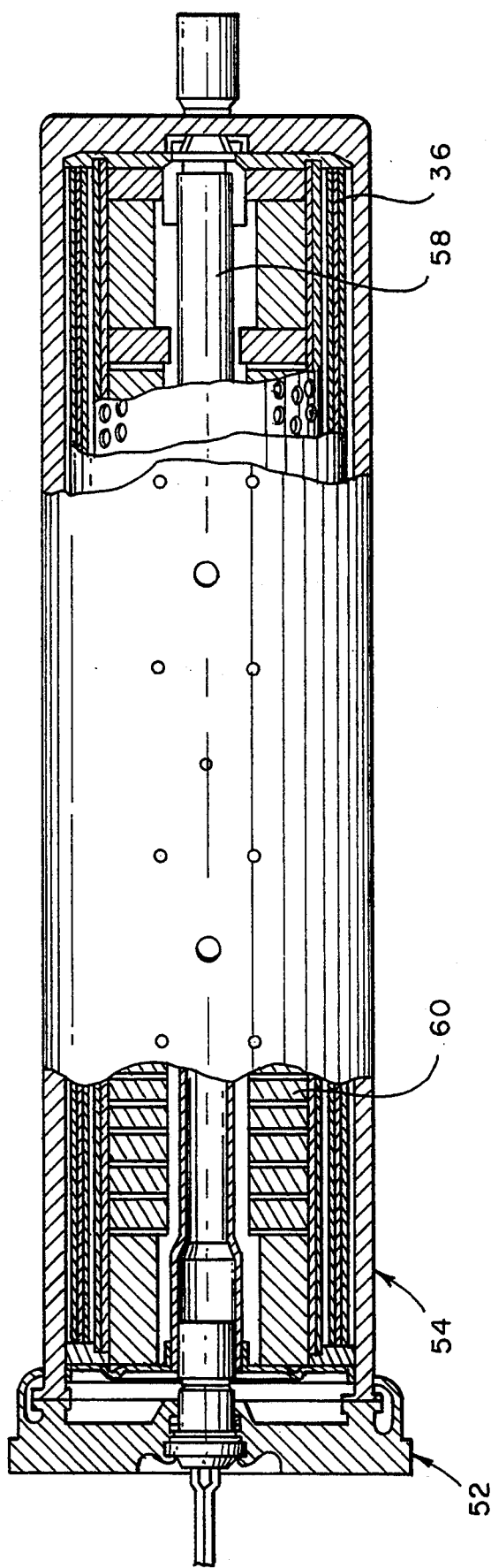
FIG. 2 is a fragmented view illustrating the placement of the as swaged filter unit in a passenger side automotive air bag inflator.

The as swaged passenger side air bag inflator filter FIG. 1 produced by the process of this invention can be used in any of a number of known inflator constructions including the construction shown in FIG. 2 and illustrated in U.S. Pat. No. 4,296,084 to Schneiter, which patent is assigned to the assignee of the present invention. The inflator 52 includes generally an outer housing 54 into which is inserted the as swaged filter unit 36 of this invention. An igniter 58 containing igniter granules and the appropriate ignition system is then inserted into the center of the inflator 52. Gas generant 60 is then loaded into the inflator 52 which is then sealed in a conventional manner known to those in the art. After ignition of the gas generant, the rapidly expanding generated gases flow outwardly from the center of the inflator 52 through the cylindrical filter assembly 36 and the filter acts as a heat exchanger for cooling the gases. Substantially all of the solid residual matter carried by the gas is trapped and retained in the various wraps of filter material.

While the invention has been specifically described in relation to swaging passenger side filter assemblies, it is to be understood that the present invention is not limited to such applications. The swaging techniques of the present invention can be used to re-size or re-shape cylindrical filter units generally having a multiple layered or stack-up structural configuration where such characteristics as diameter, wall thickness, roundness, straightness, cylindricality are desirable. The swaging operation of this invention is generally applicable to re-sizing and re-shaping any cylindrical filter assemblies which exhibit an inherent lack of roundness because of their multiple layered or stack-up structural configurations and/or method of manufacture.

Thus, in accordance with this invention, there has been provided and improved method for re-sizing and re-shaping oversize out-of-round cylindrical filter assemblies. Additionally, there has been provided an improved method for eliminating the inherent lack of roundness of cylindrical filter assemblies having multiple layered or stack-up structural configurations by re-sizing and re-shaping said assemblies in a rotary swaging machine.

With this description of the invention in detail, those skilled in the art will appreciate that modifications may be made to the invention without departing from the spirit thereof. Therefore, it is not intended that the scope of the invention be limited to the specific embodiments that have been illustrative and described. Rather, it is intended that the scope of the invention be determined by the scope of the appended claims.

What is claimed is:

1. A method of re-sizing and re-shaping an as-wrapped cylindrical gas generator filter assembly having a multiple layered or stack-up wrapped configuration comprising:

feeding a discrete or continuous length of said multiple layered or stack-up cylindrical filter assembly having at least one open end and exterior and interior surfaces through one or more pairs of opposed dies of a rotary swaging machine and subjecting the exterior surface of the filter assembly to a sufficient number of controlled impact blows applied radially by said one or more pairs of opposed dies to re-size and re-shape said filter assembly to the required size and cylindricality.

2. A method of re-sizing and re-shaping a cylindrical gas generator filter assembly of claim 1 wherein the as-wrapped filter assembly is manufactured by forming a hollow cylindrical member, sizing and welding said hollow member to form an inner core of said filter assembly, wrapping the exterior surface of the hollow inner core member by directly contacting said surface with substantially coextending wraps of additional filter material wound outwardly from said core member, and joining the trailing end of the radially most outward wrap of filter material to the filter assembly by bonding means.

3. A method of re-sizing and re-shaping an as-wrapped cylindrical gas generator filter assembly of claim 1 wherein the as-wrapped cylindrical filter assembly includes a perforated support tube.

4. A method of re-sizing and re-shaping an as-wrapped cylindrical filter assembly of claim 2 wherein additional filter material comprising second, third and fourth wraps of different filter material are wound outward of said inner core.

5. A method of re-sizing and re-shaping an as-wrapped cylindrical filter assembly of claim 4, wherein said inner core is formed of three wraps of metal woven cloth.

6. A method of re-sizing and re-shaping an as-wrapped cylindrical filter assembly of claim 4 wherein said inner core is formed of three wraps of expanded metal.

7. A method of re-sizing and re-shaping an as-wrapped cylindrical filter assembly of claim 4 wherein said inner core is formed of three wraps of 30×30 mesh woven cloth.

8. A method of re-sizing and re-shaping an as-wrapped cylindrical filter assembly of claim 7 wherein said wraps of additional filter material are formed by wrapping six wraps of 18×18 mesh metal woven cloth, three wraps of paper filter and one wrap of 45×170 mesh metal woven cloth outward of said inner core.

* * * * *